(12) United States Patent  (10) Patent No.: US 7,871,718 B2
Inamura et al.  (45) Date of Patent: Jan. 18, 2011

(54) PERPENDICULAR MAGNETIC RECORDING MEDIUM AND MAGNETIC STORAGE APPARATUS

(75) Inventors: Ryosaku Inamura, Kawasaki (JP); Yuta Toyoda, Kawasaki (JP)

(73) Assignee: Showa Denko K. K., Tokyo (JP)

( * ) Notice: Subject to any disclaimer, the term of this patent is extended or adjusted under 35 U.S.C. 154(b) by 1 day.

(21) Appl. No.: 12/403,215

(22) Filed: Mar. 12, 2009

(65) Prior Publication Data

US 2009/0296278 A1    Dec. 3, 2009

(30) Foreign Application Priority Data

May 30, 2008    (JP)    ............................. 2008-142916

(51) Int. Cl.
G11B 5/66    (2006.01)
(52) U.S. Cl. .................................. 428/831.2
(58) Field of Classification Search .................. None
See application file for complete search history.

(56) References Cited

U.S. PATENT DOCUMENTS

2007/0153419 A1*    7/2007    Arai et al. .................... 360/131
2010/0035085 A1*    2/2010    Jung et al. .................. 428/800

FOREIGN PATENT DOCUMENTS

| JP | A 2001-155321 | 6/2001 |
| JP | A 2005-353256 | 12/2005 |
| JP | A 2007-179598 | 7/2007 |
| JP | A 2007-184019 | 7/2007 |
| JP | A 2007-257804 | 10/2007 |

OTHER PUBLICATIONS

Toshio Ando, et al., "Triple-Layer Perpendicular Recording Media for High SN Ratio and Signal Stability," IEEE Transactions on Magnetics, vol. 33, No. 5, pp. 2983-2985, Sep. 1997.
S.S.P. Parkin, "Systematic Variation of the strength and Oscillation Period of Indirect Magnetic Exchange Coupling through the 3d, 4d, and 5d Transition Metals," Physical Review Letters, vol. 67, No. 25, pp. 3598-3601, Dec. 16, 1991.

* cited by examiner

*Primary Examiner*—Holly Rickman
(74) *Attorney, Agent, or Firm*—Greer, Burns & Crain, Ltd.

(57) ABSTRACT

A perpendicular magnetic recording medium includes a nonmagnetic seed layer, a nonmagnetic intermediate layer provided on the nonmagnetic seed layer, and a perpendicular recording layer provided on the nonmagnetic intermediate layer. The nonmagnetic seed layer includes a first seed layer made of an amorphous material, and a second seed layer provided between the first seed layer and the nonmagnetic intermediate layer and made of a material having a fcc structure. The amorphous material includes at least one element selected from a group consisting of Ta, W, Nb, Mo, Zr and alloys thereof which include at least one of Ta, W, Nb, Mo and Zr as a main component exceeding 50 at. %.

18 Claims, 4 Drawing Sheets

FIG.4

| SAMPLE | 1ST SEED LAYER 13-1 | | 2ND SEED LAYER 13-2 | | GRAIN DIAMETER (nm) | Δθ50 (deg) | SNR (dB) |
|---|---|---|---|---|---|---|---|
| | MATERIAL | FILM THICKNESS (nm) | MATERIAL | FILM THICKNESS (nm) | | | |
| Cmp1 | – | – | NiW8 | 6.4 | 8.0 | 3.9 | 18.0 |
| Cmp2 | – | – | NiW8 | 4.9 | 7.7 | 4.5 | 18.1 |
| Emb1 | Ta | 1.5 | NiW8 | 4.9 | 7.3 | 3.6 | 18.7 |
| Emb2 | Ta | 3.0 | NiW8 | 3.4 | 7.1 | 5.8 | 17.9 |
| Emb3 | W | 1.5 | NiW8 | 4.9 | 7.6 | 3.6 | 18.4 |
| Emb4 | W | 3.0 | NiW8 | 3.4 | 7.3 | 12.5 | 8.7 |
| Emb5 | CrW60 | 1.5 | NiW8 | 4.9 | 7.8 | 3.9 | 17.9 |

PERPENDICULAR MAGNETIC RECORDING MEDIUM AND MAGNETIC STORAGE APPARATUS

CROSS-REFERENCE TO RELATED APPLICATIONS

This application is based upon and claims the benefit of priority of the prior Japanese Patent Application No. 2008-142916, filed on May 30, 2008, the entire contents of which are incorporated herein by reference.

FIELD

The present invention generally relates to magnetic recording media and magnetic storage apparatuses, and more particularly to a perpendicular magnetic recording medium which employs the perpendicular magnetic recording technique and a magnetic storage apparatus having such a perpendicular magnetic recording medium.

BACKGROUND

Magnetic storage apparatuses typified by magnetic disk drives include a built-in type which is built into a personal computer (PC) or the like, and an external type which is connected externally to the PC or the like. In such magnetic storage apparatuses, there are demands to increase the surface recording density of the magnetic recording medium in order to increase the storage capacity of the magnetic storage apparatus.

Recently, magnetic storage apparatuses employing the perpendicular magnetic recording technique, having a high recording bit stability even at high recording densities, have been reduced to practice. When increasing the surface recording density of the magnetic recording medium, it is necessary to reduce the medium noise in the perpendicular magnetic recording medium which employs the perpendicular magnetic recording technique, similarly as in the case of the magnetic recording medium employing the horizontal (or in-plane) magnetic recording technique.

A proposal has been made to use a granular magnetic layer for a perpendicular recording layer of the perpendicular magnetic recording medium in order to reduce the medium noise. In the granular magnetic layer, a nonmagnetic material, such as an oxide or a nitride, is formed at a grain boundary of magnetic grains to magnetically separate or isolate the magnetic grains, in order to reduce the medium noise. In addition, various methods have been proposed to promote the magnetic separation or isolation of the magnetic grains in the granular magnetic layer. For example, a Japanese Laid-Open Patent Publication No. 2005-353256 proposes a method of separating crystal grains of a nonmagnetic intermediate layer immediately under the perpendicular recording layer by a gap.

In order to further increase the surface recording density of the perpendicular magnetic recording medium, it is necessary to further improve the signal-to-noise ratio (SNR). Presently, the mainstream measures for further improving the SNR reduces the medium noise. In order to reduce the medium noise, it is necessary to reduce the magnetic grain size, make the magnetic grain size uniform, and reduce the crystal orientation dispersion of the perpendicular recording layer. In this specification, the reducing of the crystal orientation dispersion of the crystal grains such as the magnetic grains will be referred to as achieving high (or improved) orientation. The nonmagnetic intermediate layer provided immediately under the perpendicular recording layer plays an important role in determining the magnetic grain characteristics described above. If the reduction of the grain size, reduction of the crystal orientation dispersion and the high orientation can be achieved with respect to the crystal grains of the nonmagnetic intermediate layer, it would be possible to reduce the grain size, reduce the crystal orientation dispersion and achieve the high orientation with respect to the perpendicular recording layer that is epitaxially grown on the nonmagnetic intermediate layer.

A technique has been proposed to provide a seed layer immediately under the nonmagnetic intermediate layer in order to reduce the grain size, reduce the crystal orientation dispersion and achieve the high orientation with respect to the nonmagnetic intermediate layer. For example, a Japanese Laid-Open Patent Publication No. 2007-179598 proposes providing a NiW seed layer having a face centered cubic (fcc) structure immediately under a Ru intermediate layer having a hexagonal close packed (hcp) structure. However, according to the medium structure proposed in the Japanese Laid-Open Patent Publication No. 2007-179598, reducing the crystal grain size of the seed layer and achieving the high orientation of the crystal grains of the seed layer are in a tradeoff relationship, and there was a limit to simultaneously reducing the crystal grain size and achieving the high orientation of the seed layer. For this reason, there was a limit to simultaneously reducing the crystal grain size of the perpendicular recording layer and achieving the high orientation of the perpendicular recording layer. Consequently, there was a limit to further reducing the medium noise in the conventional perpendicular magnetic recording medium, and there was a limit to further increasing the surface recording density of the conventional perpendicular magnetic recording medium.

The applicants are also aware of Japanese Laid-Open Patent Publications No. 2001-155321, No. 2007-257804 and No. 2007-184019. The applicants are further aware of Toshio Ando et al., "Triple-Layer Perpendicular Recording Media for High SN Ratio and Signal Stability", IEEE Transactions on Magnetics, Vol. 33, No. 5, September 1997, pp. 2983-2985, and S. S. P. Parkin, "Systematic Variation of the Strength and Oscillation Period of Indirect Magnetic Exchange Coupling through the 3d, 4d, and 5d Transition Metals", Physical Review Letters, Vol. 67, No. 25, Dec. 16, 1991, pp. 3598-3601.

Therefore, in the conventional perpendicular magnetic recording media, there were problems in that there is a limit to simultaneously reducing the magnetic grain size and achieving the high orientation of the perpendicular recording layer, and that it is difficult to further reduce the medium noise.

SUMMARY

Accordingly, it is an object in one aspect of the invention to provide a perpendicular magnetic recording medium and a magnetic storage apparatus, which can simultaneously reduce the magnetic grain size and achieve the high orientation of the perpendicular recording layer, and further reduce the medium noise.

One aspect of the present invention is to provide a perpendicular magnetic recording medium including a nonmagnetic seed layer, a nonmagnetic intermediate layer provided on the nonmagnetic seed layer, and a perpendicular recording layer provided on the nonmagnetic intermediate layer, wherein the nonmagnetic seed layer includes a first seed layer made of an amorphous material, and a second seed layer provided between the first seed layer and the nonmagnetic intermediate layer and made of a material having a fcc structure, and the amorphous material includes at least one element selected from a group consisting of Ta, W, Nb, Mo, Zr and alloys thereof which include at least one of Ta, W, Nb, Mo and Zr as a main component exceeding 50 at. %.

Another aspect of the present invention is to provide a magnetic storage apparatus including at least one magnetic recording medium, and a transducer configured to write information on the magnetic recording medium and/or read information from the magnetic recording medium, wherein the magnetic recording medium employs a perpendicular magnetic recording technique and has a structure described above.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 4 is a diagram illustrating characteristics of embodiment samples and comparison samples;

DESCRIPTION OF EMBODIMENTS

Preferred embodiments of the present invention will be described with reference to the accompanying drawings.

According to one aspect of the present invention, a perpendicular magnetic recording medium has a structure in which a nonmagnetic intermediate layer is provided between a nonmagnetic seed layer and a perpendicular recording layer. In addition, the nonmagnetic seed layer includes a first seed layer made of an amorphous material, and a second seed layer provided between the first seed layer and the nonmagnetic intermediate layer and made of a material having a fcc structure.

The present inventors have found that, when the nonmagnetic seed layer is formed by the first seed layer made of the amorphous material and the second seed layer made of the material having the fcc structure, it is possible to simultaneously reduce the crystal grain size of the nonmagnetic seed layer and achieve high orientation of the nonmagnetic seed layer, particularly when a refractory material, including Ta, W, Nb, Mo, Zr and alloys thereof, is used in a thin film state in the amorphous region.

By simultaneously reducing the crystal grain size and achieving the high orientation of the seed layer, it becomes possible to simultaneously reduce the magnetic grain size of the perpendicular recording layer and achieve high orientation of the perpendicular recording layer. For this reason, it becomes possible to reduce the medium noise, and to further increase the surface recording density.

In other words, in a perpendicular magnetic recording medium and a magnetic storage apparatus according to one aspect of the present invention, it is possible to simultaneously reduce the magnetic grain size and achieve the high orientation of the perpendicular recording layer, and further reduce the medium noise.

Figure 1:
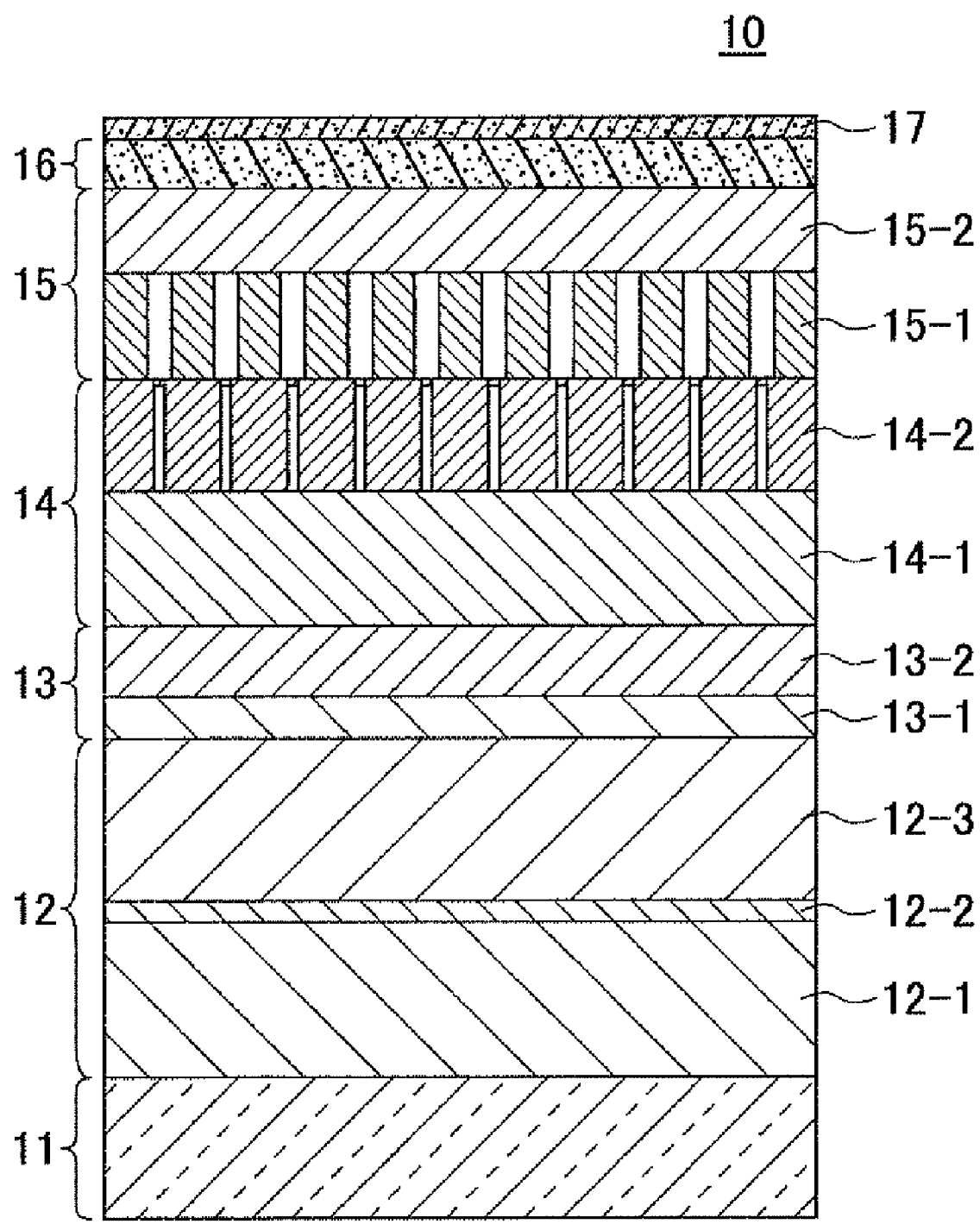
FIG. 1 is a cross sectional view illustrating a portion of a perpendicular magnetic recording medium in an embodiment of the present invention.

FIG. 1 is a cross sectional view illustrating a portion of a perpendicular magnetic recording medium in an embodiment of the present invention. For example, a perpendicular magnetic recording medium 10 illustrated in FIG. 1 is a magnetic disk.

The perpendicular recording medium 10 has a structure including a soft magnetic underlayer 12, a nonmagnetic seed layer 13, a nonmagnetic intermediate layer 14, a perpendicular recording layer and a protection layer 16 which are successively stacked on a nonmagnetic substrate 11. In order to improve the adhesion or to control the magnetic anisotropy of the soft magnetic underlayer 12, a seed layer (not illustrated) may further be provided between the nonmagnetic substrate 11 and the soft magnetic underlayer 12. A lubricant layer 17 is provided on the protection layer 16.

In this embodiment, the nonmagnetic substrate 11 is formed by a glass substrate. However, the nonmagnetic substrate 11 is not limited to the glass substrate, and other substrates such as a chemically strengthened glass substrate, a crystalline glass substrate, a NiP-plated Al substrate, a NiP-plated Al alloy substrate, a plastic substrate, a Si substrate, and a thermally oxidized Si substrate may be used for the nonmagnetic substrate 11.

The soft magnetic underlayer 12 may have a stacked structure made up of two or more layers, in order to control the magnetic domains of the soft magnetic underlayer 12 itself, for example. In this embodiment, the soft magnetic underlayer 12 has a stacked structure including a soft magnetic layer 12-1, a nonmagnetic separation layer 12-2 and a soft magnetic layer 12-3.

The soft magnetic layer 12-1 is made of FeCoTaZr, for example. However, the soft magnetic layer 12-1 may be made of other soft magnetic materials in the amorphous or microcrystalline structure region, such as CoZrNb, CoNbTa, FeCoZrNb, FeCoB, FeCoCrB, NiFeSiB, FeAlSi, FeTaC, FeHfC and NiFe. It is desirable that the soft magnetic material has the amorphous or microcrystalline structure in order to reduce the noise from the nonmagnetic underlayer 12. The nonmagnetic separation layer 12-2 is made of Ru, for example. However, the nonmagnetic separation layer 12-2 may be made of materials other than Ru, such as the materials disclosed in S. S. P. Parkin, "Systematic Variation of the Strength and Oscillation Period of Indirect Magnetic Exchange Coupling through the 3d, 4d, and 5d Transition Metals", Physical Review Letters, Vol. 67, No. 25, Dec. 16, 1991, pp. 3598-3601. The soft magnetic layer 12-3 is made of FeCoNbZr, for example.

The soft magnetic underlayer 12 may be omitted. However, it is desirable to provide the soft magnetic underlayer 12 in order to obtain a recording magnetic field and a magnetic field gradient that are large.

The nonmagnetic seed layer 13 includes a first seed layer 13-1 made of an amorphous material, and a second seed layer 13-2 made of a material having a fcc structure.

The first seed layer 13-1 is preferably made of Ta, W, Ta alloy or W alloy such as CrW, however, the amorphous material used for the first seed layer 13-1 is not limited to such. Any suitable amorphous material that can reduce the crystal grain size and achieve the high orientation of the second seed layer 13-2 may be used for the first seed layer 13-2. In other words, because the first seed layer 13-1 simply needs to be amorphous, the first seed layer 13-1 may be made of an amorphous material that includes at least one element selected from a group consisting of Ta, W, Nb, Mo, Zr and alloys thereof which include at least one of Ta, W, Nb, Mo and Zr as a main component exceeding 50 at. %. Ta, W, Nb, Mo, Zr and alloys thereof which include at least one of Ta, W, Nb, Mo and Zr as the main component exceeding 50 at. % have a high melting point and assumes an amorphous state in the thin film state. In addition, alloys such as CoW60 is also an amorphous material which may be used for the first seed layer 13-1. Since the first seed layer 13-1 needs to be amorphous, it is possible to use a noble metal material having a relatively high melting point for the first seed layer 13-1. But of course, the perpendicular magnetic recording medium 10 becomes more expensive when the noble metal material is used for the first seed layer 13-1.

Although it depends on the material forming the layer provided immediately under the first seed layer 13-1, in general, an extremely thin film having a film thickness of 1 nm or less is unlikely to form a continuous layer structure in an in-plane direction of the thin film and an island-like discontinuous layer structure is more likely formed instead. If the first seed layer 13-1 has such a discontinuous layer structure, the crystal grain size of the second seed layer 13-1 provided immediately above the first seed layer 13-1 may be reduced and the crystal grain size distribution of the second seed layer 13-2 may become uniform, however, the crystal orientation of the second seed layer 13-2 will deteriorate and it will be impossible to achieve a high orientation. In addition, if the film thickness of the first seed layer 13-1 exceeds 3 nm, a crystal structure unique to the material begins to appear, and a high orientation of the crystal grains is unlikely to be achieved. For this reason, the film thickness of the first seed layer 13-1 in this embodiment is preferably set to 1 nm to 3 nm, and more preferably to 1 nm to 2 nm.

The second seed layer 13-2 is preferably made of a material having a fcc structure which includes Ni as a main component and at least one element selected from a group consisting of W, Nb, Zr, Ta, Mo, V and alloys thereof, however, the materials that may be used for the second seed layer 13-2 are not limited to such. The Ni alloy used for the second seed layer 13-2 preferably includes a total of 20 at. % or less of the at least one element selected from the group consisting of W, Nb, Zr, Ta, Mo, V and alloys thereof, because lattices are uneasily formed and the crystallinity required of the second seed layer 13-2 cannot be maintained if the total of 20 at. % is exceeded by a film forming method using the deposition technique (sputtering, chemical vapor deposition (CVD), etc.) for mass production. W, Nb, Zr, Ta, Mo and V have Goldschmidt radii greater than that of Ni, and easily become an origin of crystal defect when added to Ni. When the crystal defect is generated, the crystal grain boundaries are induced and the crystal grain diameter of the Ni alloy is more easily reduced. The Goldschmidt radius refers to a radius of a rigid sphere when the crystal structure of a single element is reproduced as a rigid sphere model, that is, the atomic radius. Furthermore, the solubility limit of W, Nb, Zr, Ta, Mo and V with respect to Ni is 10 at. % and relatively high, and the crystal grain size can be reduced while maintaining the crystal structure of the Ni alloy. The crystal grain size can be reduced by increasing the amount of the additive element that is added to Ni, however, the crystal orientation deteriorates with the increasing amount of the additive element. Hence, in this embodiment, the first seed layer 13-1 made of the amorphous material is provided immediately under the second seed layer 13-2, in order to suppress the deterioration of the crystal orientation of the second seed layer 13-2 and to suppress the deterioration of the crystal orientation of the seed layer 13 as a whole.

The second seed layer 13-2 is made of a material having a fcc structure, and needs to be crystalline. Generally, a metal thin film requires a certain film thickness in order to maintain the crystal structure. As described above, if the film thickness of the metal thin film is 3 nm or less, it is difficult to obtain the crystal structure. For the above described materials used for the second seed layer 13-2, a mass production process which forms a satisfactory crystal structure at the film thickness of 3 nm or less has not been reported. On the other hand, although the crystal structure of the second seed layer 13-2 is improved by increasing the film thickness thereof, a distance between a head (not illustrated) and the soft magnetic underlayer 12 will be increased thereby. The distance between the head and the soft magnetic underlayer 12 affects the recording magnetic field intensity and the recording magnetic field gradient. In order to generate a sufficiently large and sharp recording magnetic field for the high-density recording, the distance between the head and the soft magnetic underlayer 12 needs to be short. Moreover, when the film thickness of the nonmagnetic seed layer 13 as a whole increases, it takes more time to perform the production process. Accordingly, the film thickness of the nonmagnetic seed layer 13 as a whole is preferably set to 11 nm or less, and more preferably to 8 nm or less. Thus, in this embodiment, the film thickness of the second seed layer 13-2 is preferably set to 3 nm to 8 nm, and more preferably to 3 nm to 6 nm.

The nonmagnetic intermediate layer 14 has a stacked structure which is made up of one or more layers and includes, at an uppermost surface portion thereof, at least a nonmagnetic intermediate layer made of Ru or an Ru alloy including Ru as a main component such that Ru is 50 at. % or more. The Ru or Ru alloy has a columnar structure in which the crystal grains are mutually separated by gaps. For example, the structure disclosed in the Japanese Laid-Open Patent Publication No. 2005-353256 may be used for the structure of the nonmagnetic intermediate layer 14. In this embodiment, the nonmagnetic intermediate layer 14 includes a Ru nonmagnetic intermediate layer 14-1 and a Ru nonmagnetic intermediate layer 14-2. The Ru nonmagnetic intermediate layer 14-2 has a structure in which the crystal grains are physically separated by the gaps. Of course, the nonmagnetic intermediate layer 14 is not limited to such a 2-layer structure, and may be formed by any structure at least having a nonmagnetic layer such as the nonmagnetic intermediate layer 14-2 with the structure in which the crystal grains are physically separated by the gaps, at the uppermost surface portion of the nonmagnetic intermediate layer 14.

The perpendicular recording layer 15 includes at least a granular magnetic layer having a columnar structure in which the magnetic grains are isolated in the non-soluble phase. In order to improve the recording and reproducing characteristics, the perpendicular recording layer 15 may have a multi-layer structure made up of two or more granular magnetic layers. In addition, in the case where the perpendicular recording layer 15 has the multi-layer structure made up of two or more granular magnetic layers, a nonmagnetic layer or a slightly magnetic layer may be provided between the granular magnetic layers. Furthermore, in order to improve the recording characteristic and the corrosion resistance, a magnetic layer having the so-called continuous layer structure may be provided on the granular magnetic layer. In this embodiment, the perpendicular recording layer 15 includes a granular magnetic layer (first magnetic layer) 15-1, and a continuous magnetic layer (second magnetic layer) 15-2 which functions as a write-assist layer having the continuous layer structure. For example, the granular magnetic layer 15-1 is made of a CoCrPt alloy, and the continuous magnetic layer 15-2 is made of a CoCrPtB alloy. In this case, the granular magnetic layer 15-1 has a columnar structure in which the CoCrPt alloy grains are isolated in the non-soluble phase. The magnetic anisotropy of the continuous magnetic layer 15-2 is smaller than that of the granular magnetic layer 15-1.

For example, the protection layer 16 is made of diamond-like carbon (DLC), and has a film thickness of 4.0 nm. For example, the lubricant layer 17 is made of a fluorine lubricant, and has a film thickness of 1.0 nm.

Next, a description will be given of a method of producing the perpendicular magnetic recording medium 10. Embodiment samples Emb1 through Emb5 of this embodiment and comparison samples Cmp1 and Cmp2 of comparison examples were made in the following manner.

Embodiment Sample Emb1

A NiP-plated Al alloy substrate was used for the nonmagnetic substrate 11 of the embodiment sample Emb1.

The magnetic domains of the soft magnetic underlayer 12 is desirably controlled in order to suppress leakage magnetic flux from the soft magnetic underlayer 12. The techniques that may be used to control the magnetic domains of the soft magnetic underlayer 12 includes the method of aligning the magnetization directions of the nonmagnetic underlayer as proposed in Toshio Ando et al., "Triple-Layer Perpendicular Recording Media for High SN Ratio and Signal Stability", IEEE Transactions on Magnetics, Vol. 33, No. 5, September 1997, pp. 2983-2985 or, the method of antiferro-magnetically coupling soft magnetic underlayers separated by an extremely thin nonmagnetic separation layer as proposed in the Japanese Laid-Open Patent Publication No. 2001-155321. In this embodiment, the soft magnetic layer 12-1, the nonmagnetic separation layer 12-2 and the soft magnetic layer 12-3 were stacked on the nonmagnetic substrate 11 as illustrated in FIG. 1, similarly to the latter proposed method.

The lower soft magnetic layer 12-1 was formed by depositing FeCoTaZr to a film thickness of 25 nm by direct current (DC) sputtering at 0.5 Pa and a power of 1 kW in an Ar atmosphere. The film thickness of the nonmagnetic underlayer 12 as a whole is preferably 10 nm or greater from the point of view of the recording and reproducing characteristics when a saturation magnetic flux density Bs of the nonmagnetic underlayer 12 is 1 (T) or higher, and is more preferably 30 nm or greater. In addition, from the point of view of the mass production facility and the cost, the film thickness of the nonmagnetic underlayer 12 as a whole is preferably 100 nm or less, and more preferably 60 nm or less.

In the following description, it is assumed that the DC sputtering is used for the deposition unless specifically indicated. However, the deposition method of each layer is of course not limited to the DC sputtering, and other suitable methods may be employed, such as radio frequency (RF) sputtering, pulse DC sputtering, and CVD.

Next, the nonmagnetic separation layer 12-2 was formed on the FeCoNbZr soft magnetic layer 12-1 by depositing Ru to a film thickness of 0.4 nm at 0.5 Pa and a power of 150 W in an Ar atmosphere. The film thickness of the Ru nonmagnetic separation layer 12-2 was selected so that the magnetizations of the adjacent magnetic layers become antiferromagnetically coupled. When Ru is used for the nonmagnetic separation layer 12-2, the film thickness in general is selected to a suitable value on the order of 0.5 nm to 1 nm.

Next, the soft magnetic layer 12-3 was formed on the Ru nonmagnetic separation layer 12-2 by depositing FeCoNbZr to a film thickness of 25 nm by DC sputtering at 0.5 Pa and a power of 1 kW in an Ar atmosphere.

The nonmagnetic seed layer 13 was deposited on the nonmagnetic underlayer 12. The nonmagnetic seed layer 13 was formed from a first seed layer 13-1 which is amorphous and a second seed layer 13-2 which has a fcc structure. When Ta was used for the first seed layer 13-1 and NiW was used for the second seed layer 13-2, it was confirmed that the crystal grain size can be reduced and the high orientation can be achieved simultaneously. In the embodiment sample Emb1, the first seed layer 13-1 was formed by depositing Ta to a film thickness of 1.5 nm by DC sputtering at 0.5 Pa and a power of 100 W in an Ar atmosphere. In addition, the second seed layer 13-2 was formed by depositing NiW8 to a film thickness of 4.9 nm by DC sputtering at 0.5 Pa and a power of 200 W in an Ar atmosphere.

The film thickness of the first seed layer 13-1 may be set within any range which will not cause crystallization of the first seed layer 13-1. However, if the first seed layer 13-1 is too thin, the first seed layer 13-1 itself will not become a continuous layer and cause deterioration of the crystal orientation of the nonmagnetic intermediate layer 14 and the layers provided above the nonmagnetic intermediate layer 14. On the other hand, if the first seed layer 13-1 is too thick, the distance between the head and the soft magnetic underlayer 12 will become long and cause undesirable effects of the recording characteristic. Accordingly, the film thickness of the first seed layer 13-1 is preferably set to 1 nm to 3 nm, and more preferably to 1 nm to 2 nm.

The second seed layer 13-2 should be relatively thin from the point of view of reducing the grain size so that the crystal grain size will not become large, but the second seed layer 13-2 should have crystallinity to a certain extent from the point of view of the crystal orientation. In addition, the second seed layer 13-2 should be thin from the point of view of the recording characteristic. Accordingly, the film thickness of the second seed layer 13-2 is preferably set to 3 nm to 8 nm, and more preferably to 3 nm to 6 nm.

The nonmagnetic intermediate layer 14 was deposited on the nonmagnetic seed layer 13. In the embodiment sample Emb1, the following stacked structure was employed in order to promote the magnetic isolation of the magnetic crystals in the granular magnetic layer 15-1. That is, the nonmagnetic intermediate layer 14-1 was formed by depositing Ru to a film thickness of 14 nm at 0.67 Pa and a power of 800 W in an Ar atmosphere. Then, the nonmagnetic intermediate layer 14-2 was formed by depositing Ru to a film thickness of 7 nm by at 5 Pa and a power of 300 W in an Ar atmosphere. The nonmagnetic intermediate layer 14-2 has the structure in which the crystal grains are physically separated by the gaps due to the effects of the high-pressure gas and the low deposition rate.

Next, the perpendicular recording layer 15 was deposited on the nonmagnetic intermediate layer 14. In the embodiment sample Emb1, the structure disclosed in the Japanese Laid-Open Patent Publication No. 2007-257804, for example, was used for the perpendicular recording layer 15 in order to obtain satisfactory recording and reproducing characteristics. In other words, the continuous magnetic layer 15-2 having the so-called continuous layer structure was provided on the granular magnetic layer 15-1 which is provided closer to the nonmagnetic substrate 11 than the continuous magnetic layer 15-2. First, the granular magnetic layer 15-1 was formed by depositing 92(66Co-13Cr-21Pt)-8TiO2 to a film thickness of 8 nm at 4 Pa and a power of 300 W in an Ar atmosphere. Then, the continuous magnetic layer 15-2 was formed on the granular magnetic layer 15-1 by depositing 63Co-20Cr-13Pt-4B to a film thickness of 7 nm at 0.5 Pa and a power of 400 W in an Ar atmosphere.

The DLC protection layer 16 was deposited on the perpendicular recording layer 15 to a film thickness of 4 nm by CVD. In addition, the lubricant layer 17 was formed on the protection layer 16 to a film thickness of 1 nm by coating a fluorine lubricant on the protection layer 16 and removing projections and foreign particles on the coated surface by use of a polishing tape.

Embodiment Sample Emb2

The total film thickness of the first seed layer 13-1 and the second seed layer 13-2 was set constant to 6.4 nm, and the film thickness of each of the first and second seed layers 13-1 and 13-2 was varied for the embodiment sample Emb2, under the same conditions used for the embodiment sample Emb1, in order to study the dependence of the characteristics of the perpendicular magnetic recording medium 10 on the film thickness of the first seed layer 13-1. The total film thickness of the first and second seed layers 13-1 and 13-2 was maintained constant so that the recording capability of the head will be the same when later comparing the recording and reproducing characteristics of the samples.

In the embodiment sample Emb2, the first seed layer 13-1 was formed by a 3.0 nm thick Ta, and the second seed layer 13-2 was formed by a 3.4 nm thick NiW8.

Embodiment Sample Emb3

The total film thickness of the first seed layer 13-1 and the second seed layer 13-2 was set constant to 6.4 nm, and the film thickness of each of the first and second seed layers 13-1 and 13-2 was varied for the embodiment sample Emb3, under the same conditions used for the embodiment sample Emb1, in order to study the dependence of the characteristics of the perpendicular magnetic recording medium 10 on the film thickness of the first seed layer 13-1.

In the embodiment sample Emb3, the first seed layer 13-1 was formed by a 1.5 nm thick W, and the second seed layer 13-2 was formed by a 4.9 nm thick NiW8. The first seed layer 13-1 was formed by depositing W by DC sputtering at 0.5 Pa and a power of 200 W in an Ar atmosphere.

Embodiment Sample Emb4

The embodiment sample Emb4 was made in a manner similar to the embodiment sample Emb3, except that the film thicknesses of the first and second seed layers 13-1 and 13-2 were set differently from those of the embodiment sample Emb3. In the embodiment sample Emb4, the first seed layer 13-1 was formed by a 3.0 nm thick W, and the second seed layer 13-2 was formed by a 3.4 nm thick NiW8.

Embodiment Sample Emb5

The embodiment sample Emb5 was made under the same conditions as the embodiment sample Emb1, except that CrW60 was used for the first seed layer 13-1. The first seed layer 13-1 was formed by a 1.5 nm thick CrW60, and the second seed layer 13-2 was formed by a 4.9 nm thick NiW8.

Comparison Sample Cmp1:

The comparison sample Cmp1 of the comparison example was made basically under the same conditions as the embodiment sample Emb1, except that no first seed layer 13-1 was provided in the comparison sample Cmp1, and the seed layer 13 is made up solely of the second seed layer 13-2 formed by a 6.4 nm thick NiW8 in the comparison example Cmp1.

Comparison Sample Cmp2:

The comparison sample Cmp2 of the comparison example was made in a similar manner to the comparison example Cmp1, except that the seed layer 13 is made up solely of the second seed layer 13-2 formed by a 4.9 nm thick NiW8 in the comparison example Cmp2 in order to study the effects of reducing the film thickness of NiW8.

Figure 2:
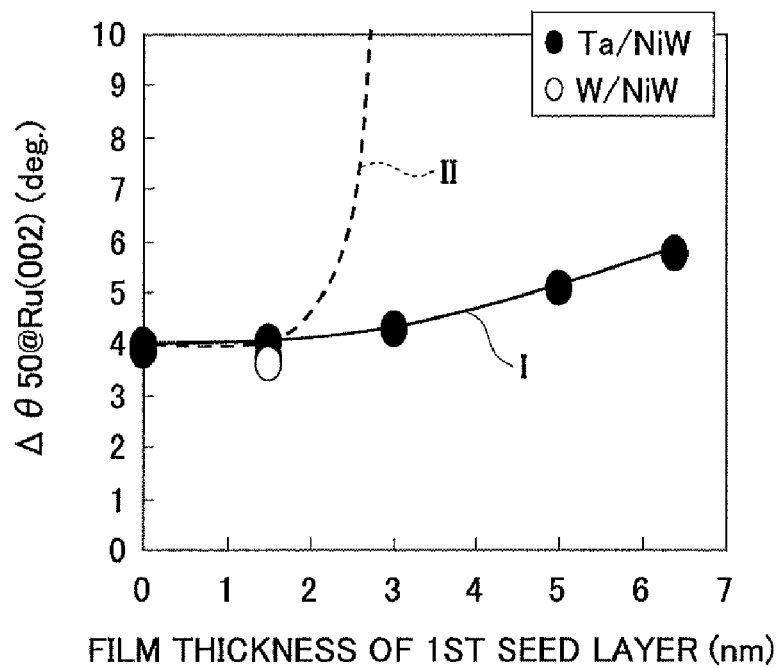
FIG. 2 is a diagram illustrating a dependency of an orientation dispersion of a nonmagnetic intermediate layer on a film thickness of a first seed layer.

FIG. 2 is a diagram illustrating a dependency of an orientation dispersion of the nonmagnetic intermediate layer 14 on the film thickness of the first seed layer 13-1. In FIG. 2, the ordinate indicates the orientation dispersion of the (002) crystal face of Ru forming the nonmagnetic intermediate layer 14, that is, a half value width $\Delta\theta 50$ (deg) obtained from a rocking curve, and the abscissa indicates the film thickness (nm) of the first seed layer 13-1. A curve I indicates the half value width $\Delta\theta 50$ for the case where the first seed layer 13-1 is made of Ta and the second seed layer 13-2 is made of NiW8 (that is, the seed layer 13 is Ta/NiW), and a curve II indicates the half value width $\Delta\theta 50$ for the case where the first seed layer 13-1 is made of W and the second seed layer 13-2 is made of NiW8 (that is, the seed layer 13 is W/NiW).

As illustrated in FIG. 2, when the first seed layer 13-1 is made of Ta and the film thickness thereof increases, the orientation dispersion of the (002) crystal face of the Ru nonmagnetic intermediate layer 14, that is, the half value width $\Delta\theta 50$, deteriorated. Because the total film thickness of the first and second seed layers 13-1 and 13-2 is maintained constant, it may be regarded that the half value width $\Delta\theta 50$ gradually deteriorated due to decreasing film thickness of the second seed layer 13-2. No clear diffraction peak of Ta(111) was observed in the X-ray diffraction, and it may be inferred that the first seed layer 13-1 made of Ta does not have a crystal structure. On the other hand, when the first seed layer 13-1 is made of W, the half value width $\Delta\theta 50$ greatly deteriorated when the film thickness of the first seed layer 13-1 is 3 nm or greater. The diffraction peak of W(111) was confirmed in the X-ray diffraction when the film thickness of the first seed layer 13-1 made of W was 3 nm or greater.

Figure 3:
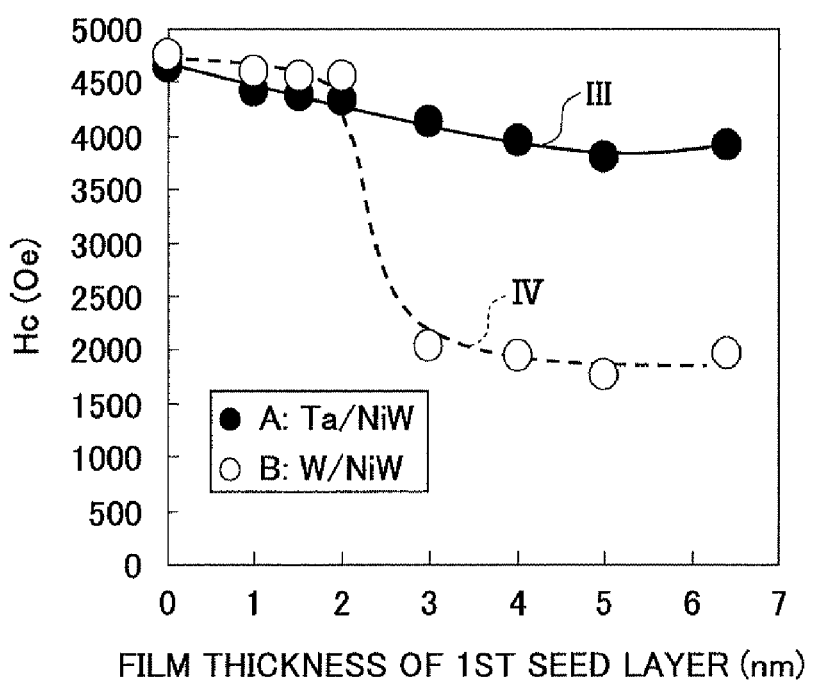
FIG. 3 is a diagram illustrating a dependence of a perpendicular recording layer on the film thickness of the first seed layer.

FIG. 3 is a diagram illustrating a dependence of the perpendicular recording layer 15 on the film thickness of the first seed layer 13-1. In FIG. 3, the ordinate indicates the coercivity Hc (Oe) of the perpendicular recording layer 15 as the magnetic characteristic, and the abscissa indicates the film thickness (nm) of the first seed layer 13-1. In FIG. 3, a curve III indicates the coercivity Hc for the case where the first seed layer 13-1 is made of Ta and the second seed layer 13-2 is made of NiW8 (that is, the seed layer 13 is Ta/NiW), and a curve IV indicates the coercivity Hc for the case where the first seed layer 13-1 is made of W and the second seed layer 13-2 is made of NiW8 (that is, the seed layer 13 is W/NiW).

As illustrated in FIG. 3, when the first seed layer 13-1 is made of W and the film thickness thereof is 3 nm or greater, the coercivity Hc sharply deteriorates. It may be regarded that this sharp deterioration of the coercivity Hc is caused by the deterioration of the half value width $\Delta\theta 50$ due to the lattice mismatch between the first seed layer 13-1 made of W and the second seed layer 13-2 made of NiW since the W crystallizes.

Accordingly, it was also confirmed from FIGS. 2 and 3 that it is important for the first seed layer 13-1 to be amorphous. The amorphous material forming the first seed layer 13-1 may include at least one element selected from a group consisting of Ta, W, Nb, Mo, Zr and alloys thereof which include at least one of Ta, W, Nb, Mo and Zr as a main component exceeding 50 at. %. From the characteristics of these amorphous materials, it may be regarded that when these amorphous materials are used for the first seed layer 13-1 the half value width $\Delta\theta 50$ and the coercivity Hc show tendencies similar to those illustrated in FIGS. 2 and 3. In addition, the material having the fcc structure and forming the second seed layer 13-2 may be made of a Ni alloy including Ni as the main component and a total of 20 at. % or less of at least one element selected from the group consisting of W, Nb, Zr, Ta, Mo, V and alloys thereof. From the characteristics of these materials having the fcc structure, it may be regarded that when these materials having the fcc structure are used for the second seed layer 13-2 the half value width Δθ50 and the coercivity Hc show tendencies similar to those illustrated in FIGS. 2 and 3.

FIG. 4 is a diagram illustrating characteristics of embodiment samples Emb1 through Emb5 and the comparison samples Cmp1 and Cmp2. The characteristics illustrated in FIG. 4 include the grain diameter (nm) of the nonmagnetic intermediate layer 14 (the nonmagnetic intermediate layer 14-1 in the case of this embodiment), the half value width Δθ50 (deg) obtained from the rocking curve of the (002) crystal face of Ru forming the nonmagnetic intermediate layer 14, and a SNR (dB) obtained by performing a test write to and a test read from the perpendicular recording layer 15 by a known method. The SNR indicates the recording and reproducing characteristics of the perpendicular magnetic recording medium 10.

The following characteristics were confirmed by comparing the crystal grain diameters, the half value widths Δθ50 and the SNRs (that is, recording and reproducing characteristics) of the embodiment samples Emb1 through Emb5 and the comparison samples Cmp1 and Cmp2. More particularly, when the bcc based Ta or W is used for the first seed layer 13-1, the crystal grain size was reduced and the half value width Δθ50 was maintained or improved in the range in which the first seed layer 13-1 is amorphous, and as a result, it was confirmed that the recording and reproducing characteristics improve. When film thickness of the first seed layer 13-1 is 3 nm or greater, the crystal grain size was reduced due to decreasing film thickness of the second seed layer 13-2 which is made of NiW, but it was confirmed that the half value width Δθ50 deteriorates and that the recording and reproducing characteristics deteriorate. Especially when the first seed layer 13-1 is made of W, the half value width Δθ50 greatly deteriorates due to the lattice mismatch between the first and second seed layers 13-1 and 13-2, and it was confirmed that the recording and reproducing characteristic greatly deteriorate. When the first seed layer 13-1 is made of CrW60, the crystal grain size is reduced and the half value width Δθ50 is improved, but the effect of reducing the crystal grain size and the effect of improving the half value width Δθ50 are not as large as when the first seed layer 13-1 is made of Ta or W. Although a clear diffraction peak cannot be observed in the X-ray diffraction for the CrW60, the Cr itself easily crystallizes even when it is a thin film, and there is a possibility that microcrystals exist in CrW60. It may be inferred that the surface roughness of the CrW first seed layer 13-1 increases due to the existence of the microcrystals, which suppresses the effect of improving the half value width Δθ50 and suppresses the effect of reducing the crystal grain size of NiW.

Therefore, from the data of FIGS. 2 through 4, it was confirmed that the first seed layer 13-1 is preferably made of Ta, W, Ta alloy or W alloy such as CrW, however, that the amorphous material used for the first seed layer 13-1 is not limited to such, and any suitable amorphous material that can reduce the crystal grain size and achieve the high orientation of the second seed layer 13-2 may be used for the first seed layer 13-2. In other words, because the first seed layer 13-1 simply needs to be amorphous, it was confirmed that the first seed layer 13-1 may be made of an amorphous material that includes at least one element selected from a group consisting of Ta, W, Nb, Mo, Zr and alloys thereof which include at least one of Ta, W, Nb, Mo and Zr as a main component exceeding 50 at. %. In addition, it was confirmed that the second seed layer 13-2 is preferably made of a Ni alloy which has the fcc structure and includes Ni as the main component and a total of 20 at. % or less of at least one element selected from the group consisting of W, Nb, Zr, Ta, Mo, V and alloys thereof. It was further confirmed that, particularly when the first seed layer 13-1 is made of a material selected from a group consisting of Ta, W and CrW, the second seed layer 13-2 is preferably made of NiW, and that when the first seed layer 13-1 is made of Ta, the second seed layer 13-2 is preferably made of NiW.

According to the embodiment described above, it is possible to form a perpendicular magnetic recording medium which has improved recording and reproducing characteristics over the conventional perpendicular magnetic recording medium. For this reason, it is possible to provide a perpendicular magnetic recording medium having a high recording density, and to provide a magnetic storage apparatus having a large storage capacity.

Figure 5:
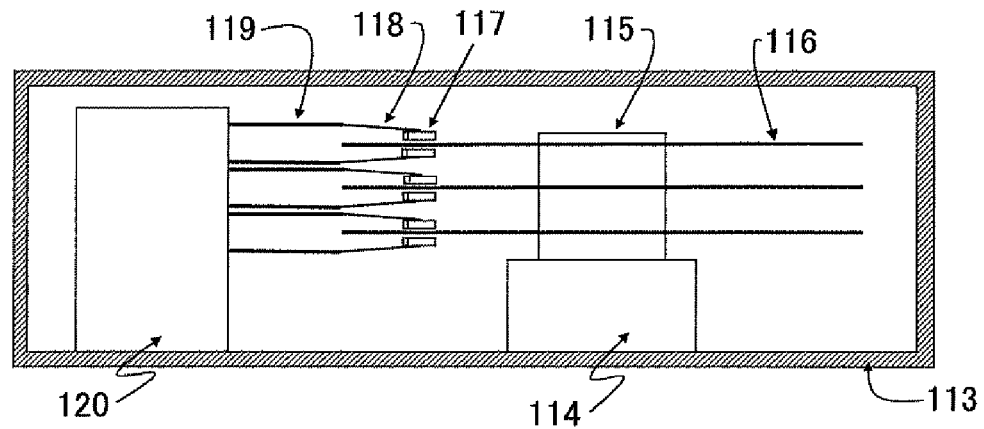
FIG. 5 is a cross sectional view illustrating a portion of a magnetic storage apparatus in an embodiment of the present invention.

Next, a description will be given of the magnetic storage apparatus in one embodiment of the present invention, by referring to FIGS. 5 and 6. FIG. 5 is a cross sectional view illustrating a portion of the magnetic storage apparatus in this embodiment of the present invention, and FIG. 6 is a plan view illustrating a portion of the magnetic storage apparatus illustrated in FIG. 5 in a state with a top cover removed.

Figure 6:
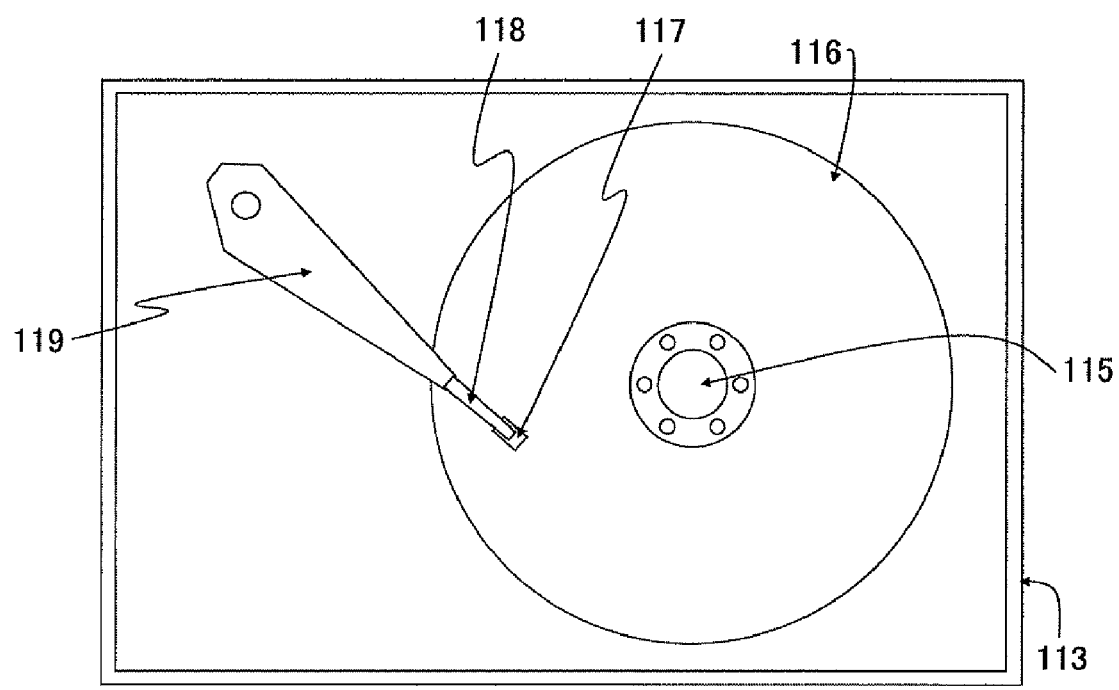
FIG. 6 is a plan view illustrating a portion of the magnetic storage apparatus illustrated in FIG. 5 in a state with a top cover removed.

As illustrated in FIGS. 5 and 6, a motor 114 is mounted on a base 113, and this motor 114 rotates a hub 115 to which a plurality of magnetic recording disks 116 are fixed. Each magnetic recording disk 116 has the structure of the perpendicular magnetic recording medium 10 illustrated in FIG. 1. Information is read from the magnetic recording disk 116 by a magneto-resistive (MR) heat which is fixed on a slider 117. A giant magneto-resistive (GMR) heat, a tunneling magneto-resistive (TuMR) heat and the like may be used for the MR head. An inductive head is combined with the MR head, and information is written on the magnetic recording disk 116 by the inductive head. The MR head and the inductive head form a transducer. The slider 117 is supported on a suspension 118, and the suspension 118 pushes the slider 117 against a recording surface of the magnetic recording disk 116. The surface of the slider 117 is patterned, and at a specific disk rotational speed and a specific suspension hardness, the slider 117 scans at a position floating by a predetermined distance from the recording surface of the magnetic recording disk 116. The suspension 118 is fixed to a rigid arm 119 which is connected to an actuator 120. Accordingly, information can be written over a relatively large area on the recording surface of the magnetic recording disk 116.

Of course, the number of magnetic recording disks 116 is not limited to three as illustrated in FIG. 5. In other words, two or four or more magnetic recording disks 116 may be provided within the magnetic storage apparatus.

In addition, the perpendicular magnetic recording medium in this embodiment is not limited to the magnetic recording disk, and the present invention is similarly applicable to various types of magnetic recording media including magnetic recording cards, for example.

All examples and conditional language recited herein are intended for pedagogical purposes to aid the reader in understanding the invention and the concepts contribute by the inventor to furthering the art, and are to be construed as being without limitation to such specifically recited examples and conditions, nor does the organization of such examples in the specification related to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. A perpendicular magnetic recording medium comprising:
   a nonmagnetic seed layer;
   a nonmagnetic intermediate layer provided on the nonmagnetic seed layer; and
   a perpendicular recording layer provided on the nonmagnetic intermediate layer, wherein the nonmagnetic seed layer includes a first seed layer made of an amorphous material, and a second seed layer provided between the first seed layer and the nonmagnetic intermediate layer and made of a material having a fcc structure, and the amorphous material includes at least one element selected from a group consisting of W, Mo, Zr and alloys thereof which include at least one of W, Mo and Zr as a main component exceeding 50 at. %.

2. A perpendicular magnetic recording medium comprising:

a nonmagnetic seed layer;

a nonmagnetic intermediate layer provided on the nonmagnetic seed layer; and a perpendicular recording layer provided on the nonmagnetic intermediate wherein the nonmagnetic seed layer includes a first seed layer made of an amorphous material, and a second seed layer provided between the first seed layer and the nonmagnetic intermediate layer and made of a material having a fcc structure, and the amorphous material includes at least one element selected from a group consisting of W, Mo, Zr and alloys thereof which include at least one of W, Mo and Zr as a main component exceeding 50 at. %, wherein the second seed layer includes Ni as a main component and Zr or alloys thereof.

3. The perpendicular magnetic recording medium as claimed in claim 2, wherein the second seed layer is made of a Ni alloy including Ni as the main component and a total of 20 at. % or less of the Zr or alloys thereof.

4. The perpendicular magnetic recording medium as claimed in claim 1, wherein the first seed layer is made of a material selected from a group consisting of W and CrW, and the second seed layer is made of NiW.

5. The perpendicular magnetic recording medium as claimed in claim 1, wherein the second seed layer is made of NiW.

6. The perpendicular magnetic recording medium as claimed in claim 1, wherein the first seed layer has a thickness of 1 nm to 3 nm.

7. The perpendicular magnetic recording medium as claimed in claim 1, wherein the first seed layer has a thickness of 1 nm to 2 nm.

8. The perpendicular magnetic recording medium as claimed in claim 1, wherein the second seed layer has a thickness of 3 nm to 8 nm.

9. The perpendicular magnetic recording medium as claimed in claim 1, wherein the second seed layer has a thickness of 3 nm to 6 nm.

10. The perpendicular magnetic recording medium as claimed in claim 1, wherein the nonmagnetic intermediate layer is made of Ru or an alloy having Ru as a main component.

11. The perpendicular magnetic recording medium as claimed in claim 1, further comprising:

a substrate; and a soft magnetic underlayer provided on the substrate, wherein the soft magnetic underlayer is made of a crystalline or amorphous material including Co and Fe.

12. The perpendicular magnetic recording medium as claimed in claim 1, wherein the perpendicular recording layer includes one or more magnetic layers made of a granular magnetic material.

13. The perpendicular magnetic recording medium as claimed in claim 1, wherein the perpendicular recording layer includes a first magnetic layer made of a granular magnetic material and provided on the nonmagnetic intermediate layer, and a second magnetic layer provided on the first magnetic layer and having a magnetic anisotropy smaller than that of the first magnetic layer.

14. A magnetic storage apparatus comprising:

at least one magnetic recording medium; and a tranducer configured to write information on the magnetic recording medium and/or read information from the magnetic recording medium, wherein the magnetic recording medium employs a perpendicular magnetic recording technique and includes a nonmagnetic seed layer, a nonmagnetic intermediate layer provided on the nonmagnetic seed layer, and a perpendicular recording layer provided on the nonmagnetic intermediate layer, wherein the nonmagnetic seed layer includes a first seed layer made of an amorphous material, and a second seed layer provided between the first seed layer and the nonmagnetic intermediate layer and made of a material having a fcc structure, and the amorphous material includes at least one element selected from a group consisting of W, Mo, Zr and alloys thereof which include at least one of W, Mo and Zr as a main component exceeding 50 at. %.

15. A magnetic storage apparatus comprising:

at least one magnetic recording medium; and a transducer configured to write information on the magnetic recording medium and/or read information from the magnetic recording medium, wherein the magnetic recording medium employs a perpendicular magnetic recording technique and includes a nonmagnetic seed layer, a nonmagnetic intermediate layer provided on the nonmagnetic seed layer, and a perpendicular recording layer provided on the nonmagnetic intermediate layer wherein the nonmagnetic seed layer includes a first seed layer made of an amorphous material, and a second seed layer provided between the first seed layer and the nonmagnetic intermediate layer and made of a material having a fcc structure, and the amorphous material includes at least one element selected from a group consisting of W, Mo, Zr and alloys thereof which include at least one of W, Mo and Zr as a main component exceeding 50 at. %, wherein the second seed layer of the magnetic recording medium includes Ni as a main component, and Zr or alloys thereof.

16. The magnetic storage apparatus as claimed in claim 15, wherein the second seed layer of the magnetic recording medium is made of a Ni alloy including Ni as the main component and a total of 20 at. % or less of the Zr or alloys thereof.

17. The magnetic storage apparatus as claimed in claim 16, wherein the first seed layer of the magnetic recording medium has a thickness of 1 nm to 3 nm.

18. The magnetic storage apparatus as claimed in claim 17, wherein the second seed layer of the magnetic recording medium has a thickness of 3 nm to 8 nm.

* * * * *